United States Patent [19]
Thompson et al.

[11] Patent Number: 4,790,145
[45] Date of Patent: Dec. 13, 1988

[54] SUPERHEAT CONTROL OF AIR CONDITIONING SYSTEM INCORPORATING FUEL COOLER

[75] Inventors: Michael B. Thompson, Hoffman Estates; Robert J. Torrence, Addison, both of Ill.

[73] Assignee: Eaton Corporation, Cleveland, Ohio

[21] Appl. No.: 119,943

[22] Filed: Nov. 13, 1987

[51] Int. Cl.$^4$ .................. F25B 41/00; F25B 41/04; F02M 15/00; F02M 31/20
[52] U.S. Cl. ................................ 62/212; 62/225; 123/41.31; 123/541
[58] Field of Search ............... 123/541, 41.31; 62/212, 62/225, 505

[56] References Cited

U.S. PATENT DOCUMENTS

| 4,155,337 | 5/1979 | Hensley | 123/541 |
| 4,571,951 | 2/1986 | Szymaszek | 62/212 |
| 4,617,804 | 10/1986 | Fukushima et al. | 62/212 |
| 4,677,830 | 7/1987 | Sumikawa et al. | 62/225 |

FOREIGN PATENT DOCUMENTS

| 3231881 | 3/1984 | Fed. Rep. of Germany | 123/541 |
| 3330250 | 3/1984 | Fed. Rep. of Germany | 123/541 |
| 3607854 | 10/1987 | Fed. Rep. of Germany | 123/541 |
| 0128653 | 10/1980 | Japan | 123/541 |

Primary Examiner—Albert W. Davis, Jr.
Assistant Examiner—John K. Ford
Attorney, Agent, or Firm—R. A. Johnston

[57] ABSTRACT

A system for preventing vapor-lock in a positively pressurized loop-type engine fuel line having the low pressure or tank return portion of the fuel line passing through a heat exchanger disposed in the refrigerant line for the vehicle air conditioner between the endothermic heat exchanger or evaporator and the compressor inlet. A thermistor senses the temperature of the refrigerant discharging from the fuel line heat exchanger and a pressure transducer senses evaporator discharge saturation pressure. Look-up tables are used to determine saturation temperature from the saturation pressure, and saturation temperature and actual refrigerant temperature compared to generate a pulse-width modulated control signal for controlling an electrically operated refrigerant expansion valve to maintain a desired amount of superheat at the discharge of the fuel line heat exchanger.

5 Claims, 6 Drawing Sheets

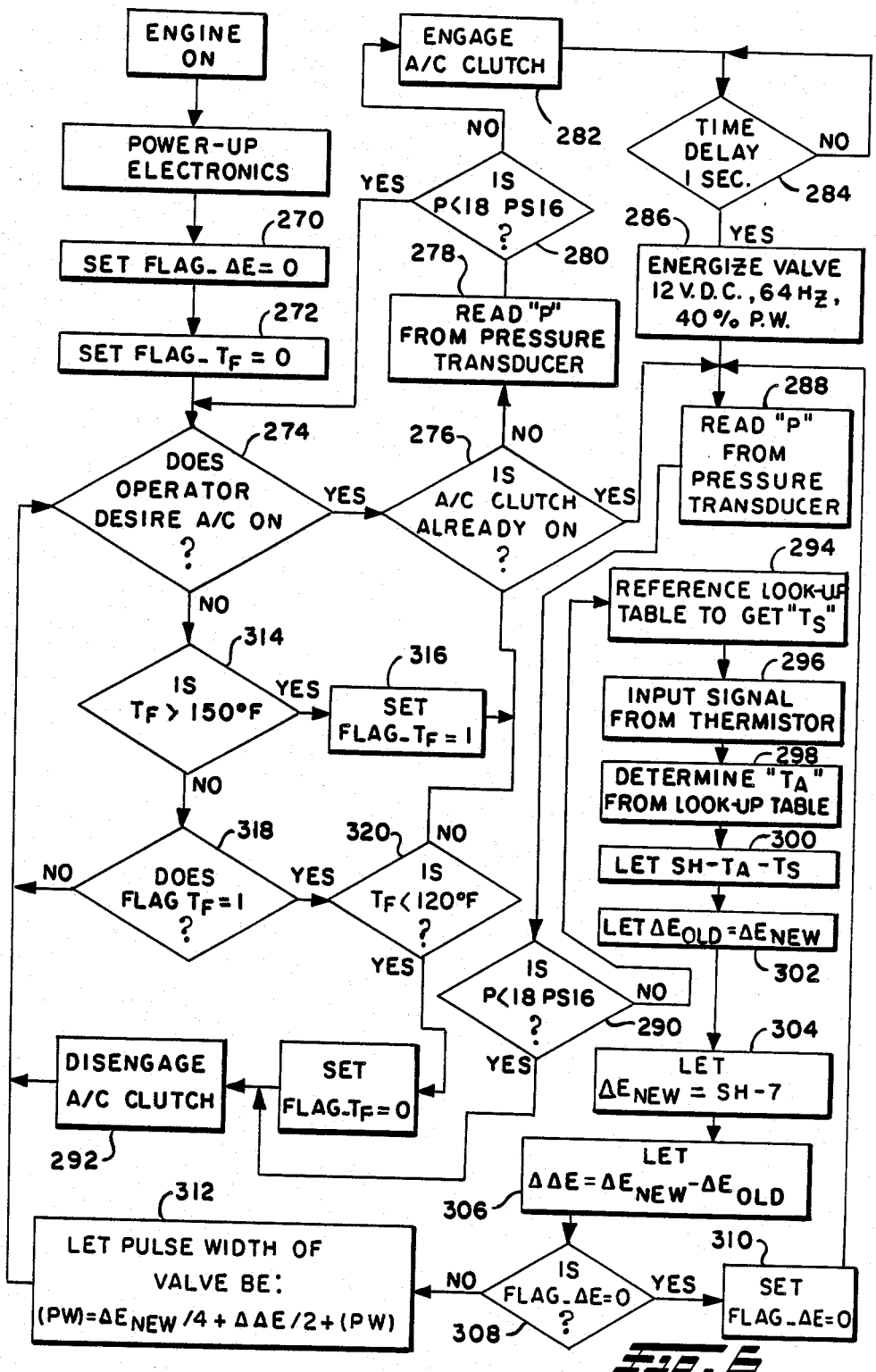

SUPERHEAT CONTROL OF AIR CONDITIONING SYSTEM INCORPORATING FUEL COOLER

CROSS-REFERENCES TO RELATED APPLICATIONS

The present application is related to the following commonly owned applications: Ser. No. 202,638 filed June 6, 1988 in the name of M. Thompson entitled "Flow Noise Suppression For Electronic Valves"; Ser. No. 119,009 filed Nov. 12, 1987 in the name of Robert Torrence entitled "Indicating Refrigerant Liquid Saturation Point"; Ser. No. 168,041 filed Mar. 14, 1988 in the name of Robert Torrence entitled "Controlling Superheat in a Refrigeration System", Ser. No. 007,147 filed Jan. 22, 1987 entitled "Controlling Refrigeration.

BACKGROUND OF THE INVENTION

The present invention relates to systems for controlling vapor lock in fuel lines of vehicles employing a Positive pressure circulating fuel supply to the engine. Fuel systems of this type are employed in automotive vehicles having fuel injected engines wherein a fuel pump is provided at the tank for circulating a continuous flow of fuel under positive pressure to the fuel injectors.

In service of vehicles employing injected engines with a positively pressurized flow of fuel continuously circulated to the injectors during engine operation, the fuel lines absorb heat from the engine compartment and problems have been encountered with vapor lock in the fuel line, particularly on the portion of the line returning fuel to the tank. The fuel returning to the tank in a Positively pressurized pumping system is discharged to the tank at substantially atmospheric pressure and therefore the fuel in the return portion of the line is subject to evaporation at a lower temperature than the fuel at a higher pressure when discharged from the pump.

In order to eliminate evaporation and vapor lock of the fuel in the return line, it has been proposed to provide an inter-cooler in the return portion of the fuel line to lower the temperature of the fuel below its vaporization point. One technique that has been suggested is that of providing a heat exchanger with the refrigerant employed for the vehicle air conditioning system. The vehicle air conditioning refrigerant is a convenient source of cooling medium in as much as the air conditioning system is usually operated in climatic conditions which would raise the engine compartment temperatures sufficient to cause vapor lock in the fuel line.

However, in attempting to provide heat exchange between the fuel line and the air conditioning system refrigerant, problems have been encountered because the air conditioning system controls are designed to control flow of refrigerant to provide a slight amount of superheat at the outlet of the air conditioning evaporator; and, therefore little cooling is available in the refrigerant for heat exchange with the fuel line. Accordingly, it has been desired to find a way or means of utilizing a heat exchanger in the air conditioning refrigerant line to cool the fuel line in order to prevent vapor lock in the low pressure side of the fuel line returning to the fuel tank.

SUMMARY OF THE INVENTION

The present invention provides a heat exchanger disposed in the low pressure or return side of a continuously circulating positively pressurized engine fuel supply, such as that employed with engines having fuel injectors, for preventing vapor lock in the low pressure side of the fuel line returning fuel to the tank.

The present invention employs an electrically operated refrigerant expansion valve for controlling flow of refrigerant to the evaporator and the fuel line heat exchanger, and employs a microprocessor based controller to provide a pulse-width-modulated duty cycle signal to the refrigerant expansion valve for controlling flow of refrigerant in the system. A pressure transducer is disposed in the refrigerant line to measure the pressure of the refrigerant flowing therein as discharged from the evaporator and provides a signal to the microprocessor. The microprocessor then determines the saturation temperature of the refrigerant from a look-up table.

A temperature sensing thermistor is disposed in a refrigerant line between the fuel line heat exchanger and the compressor intake and provides a signal to the microprocessor of the actual temperature of the refrigerant discharging from the fuel line heat exchanger. The microprocessor then compares the saturation temperature with the actual temperature to determine the amount of superheat at the outlet of the fuel line heat exchanger and provides the pulse with modulated signal to the refrigerant expansion valve from a predetermined algorithm based upon the superheat at the outlet of the fuel line heat exchanger.

An optional feature of the invention permits the compressor for the air conditioning system to be initially energized upon command from the microprocessor based upon measurements of the temperature of the fuel in the fuel line.

DETAILED DESCRIPTION

Figure 1:
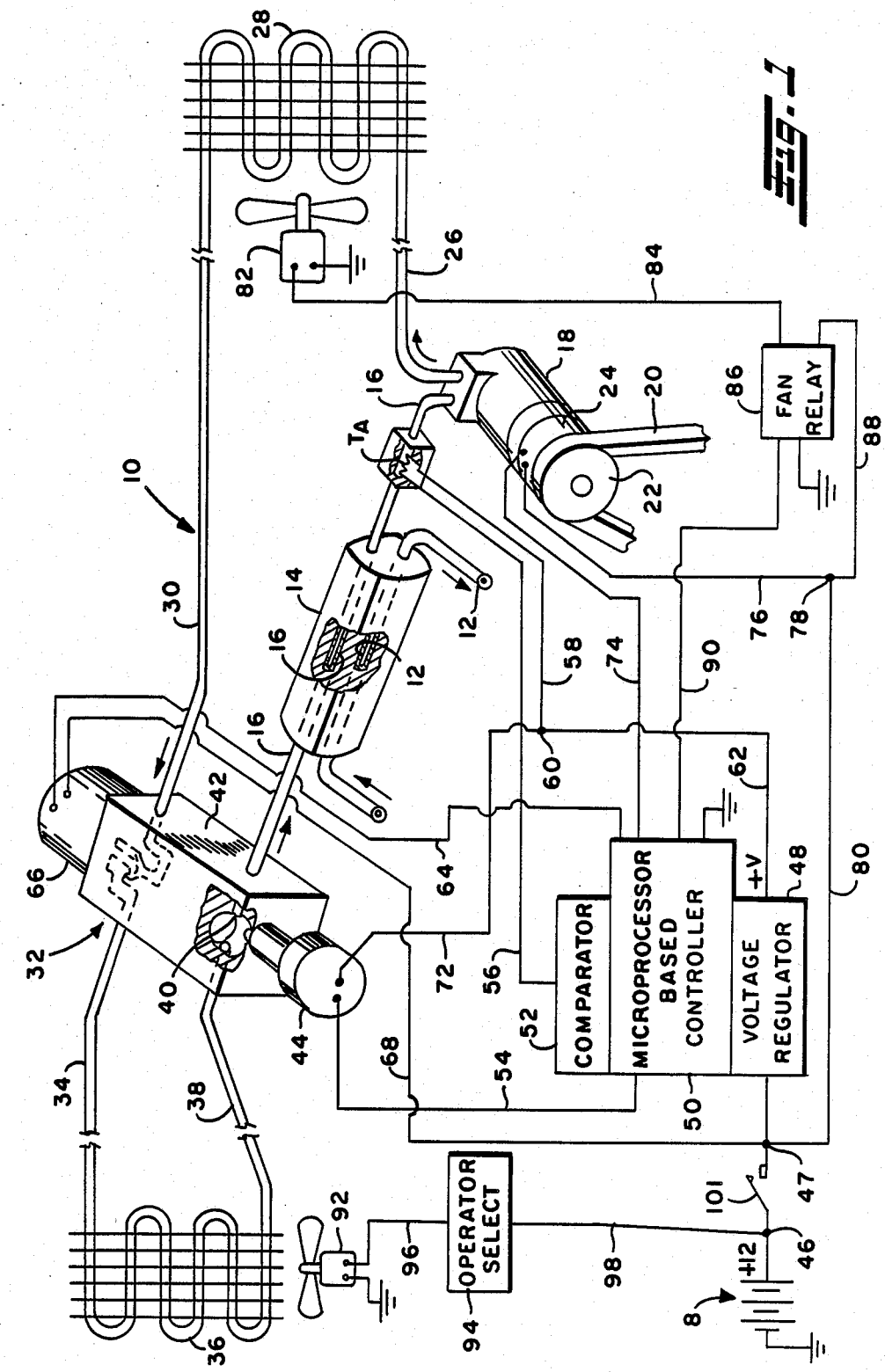
FIG. 1 is a schematic of the control system of the present invention illustrating the refrigerant circuit and the electrical connection of the components.

Referring to FIG. 1, the system of the present invention is indicated generally at 10 as having a portion 12 of the low pressure side of an engine fuel line circulating through a heat exchanger block 14 which has a portion of the refrigerant line 16 of the vehicle air conditioning system passing through block 14 in heat exchange relationship with the fuel line 12. The refrigerant line 16 passes from the heat exchanger block 14 to the inlet of a compressor 18 which is adapted to be engine driven by a belt 20 passing over a pulley 22 which is clutched to the compressor by an electrically actuated clutch 24. The outlet of the compressor 18 is discharged through conduit 26 to an exothermic heat exchanger or condenser 28 which discharges along conduit 30 to the inlet of an electrically operated expansion valve indicated generally at 32 which discharges low pressure refrigerant through conduit 34 to the inlet of an endothermic heat exchanger or evaporator 36 disposed in the vehicle compartment to be cooled. The evaporator 36 discharges refrigerant through conduit 38 through a passage 40 provided in the block 42 of valve 32 which passage 40 communicates with conduit 16 for returning refrigerant to the fuel line heat exchanger and the compressor.

A pressure transducer 44 has its inlet port communicating with the passage 40 for sensing the pressure of the refrigerant discharged from the evaporator 36.

Electrical power for the system is provided by the vehicle supply indicated generally at B through junction 46 and junction 47 to a voltage regulator 48 which provides power to the microprocessor based controller 50. The controller 50 receives inputs from comparator 52 and the pressure transducer signal along line 54.

The comparator 52 receives a signal along line 56 from one lead of a thermistor indicated b $T_A$ with the remaining lead 58 from the thermistor connected to junction 60 which receives a positive supply voltage $+V$ along line 62 from the voltage regulator.

The controller 50 provides an output signal along line 64 to one lead of a solenoid coil 66 attached to the valve block 42 for providing electromagnetic energization of the refrigerant valve. The remaining side of the coil 25 receives power along line 68 to power junction 47.

A compressor clutch signal is provided from the controller 50 along line 74 to the compressor clutch which receives power along line 76 through junction 78 and power lead 80 connected to power junction 47.

If desired, a condenser cooling fan motor 82 may be provided receiving power along lead 84 from relay 86 powered from junction 78 through lead 88 with the signal input to the relay 86 provided along lead 90 from the controller 50. The details of the manner of controlling the condenser fan 82 are described in the co-pending application of Robert J. Torrence entitled "Indicating Refrigerant Liquid Saturation Point" and commonly assigned to the assignee of the present application and will be omitted here for the sake of simplicity.

In the typical automotive air conditioning system, an evaporator blower motor 92 is provided for discharging air over the evaporator to the passenger compartment; and, the motor 92 may be powered by an operator select switch 94 connected to the motor by lead 96 and receiving power along lead 98 from junction 46.

Figure 2:
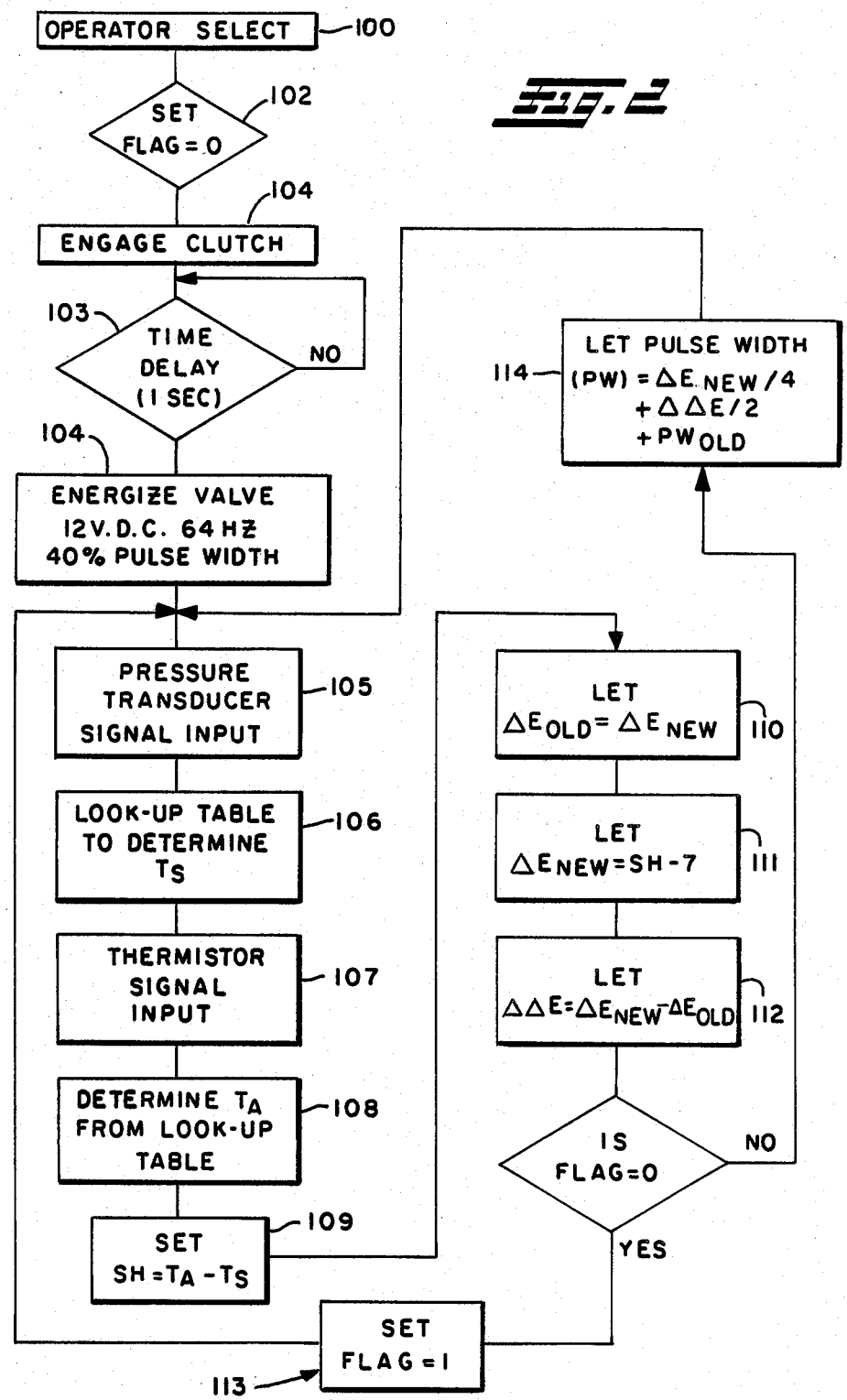
FIG. 2 is a flow diagram of the electrical control signal generation for the system of FIG. 1.

Referring to FIG. 2 in the first embodiment of the invention, upon energization of the compressor clutch by the operator select step 100, and set FLAG equals zero, at 102, the compressor clutch is engaged at step 104 and after a suitable time delay of approximately 1 second at step 103, an initial 40% duty cycle pulse-width-modulated signal is provided at step 104 to the solenoid coil 66 of the expansion valve 32. Upon system power up, the pressure signal from the pressure transducer 44 is applied to the controller 50 at step 105.

Figure 4:
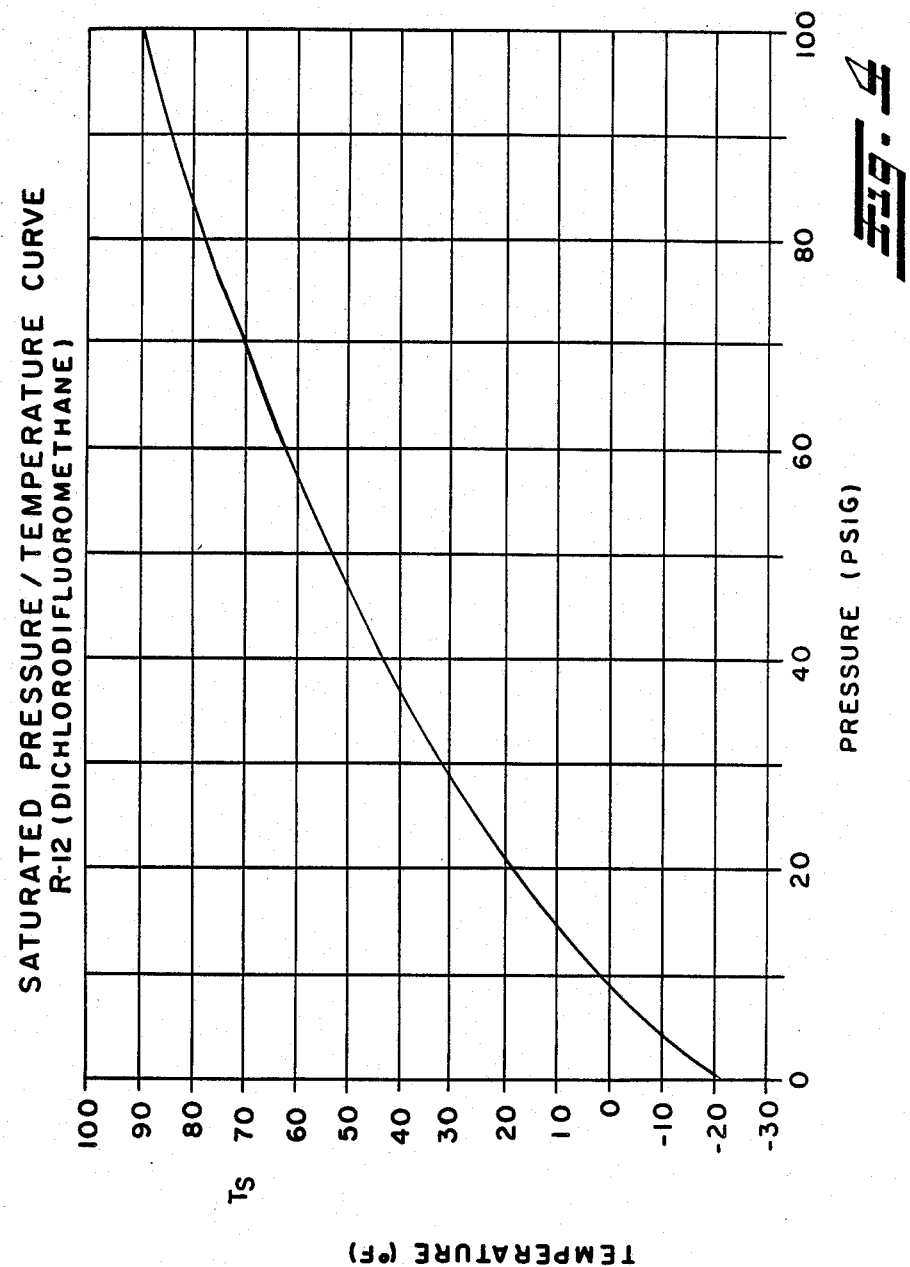
FIG. 4 is a pressure temperature plot for the refrigerant employed in the system of FIG. 1.

The microprocessor of controller 50 is operative at step 106 to enter a look-up table in memory to determine the saturation temperature TS corresponding to the measured temperature from manufacturers information for the particular refrigerant employed. Preferably, refrigerant available commercially under the designation Freon 12, is employed and the pressure-temperature plot therefor is illustrated in FIG. 4.

The signal from thermistor $T_A$ is inputted to the controller 50 at step 107 and the temperature $T_A$ is determined from a look-up table at step 108. The super heat is then determined at step 109 by subtracting a derived saturation temperature $T_S$ from the actual measured temperature $T_A$ at step 109.

At step 110, $\Delta E_{old}$ is equated to $\Delta E_{new}$; and, at step 111 $\Delta E_{new}$ is equated to subtracting 7° from the superheat determined in step 109, where $\Delta E$ is the error between the actual superheat and the desired superheat of 7° F.

At step 112 the change $\Delta\Delta E$ is equated to $\Delta E_{old}$ subtracted from $\Delta E_{new}$; and, in step 113 FLAG is set equal to 1. In step 114, the pulse-width PW is determined by adding to the previous pulse width the quantity $\Delta E_{new}/4$ and $\Delta\Delta E/2$, thus providing an updated value for the pulse-width-modulated control signal to the solenoid 66.

The thermistor $T_A$ in the presently preferred Practice is a 30K ohm NTC thermistor available from Fenwall Electronics, 63 Fountain St., Framingham, Mass. 01701 bearing manufacturer's identification UUR43J24 and has a resistance of 30K ohms at 25° C.

Figure 3:
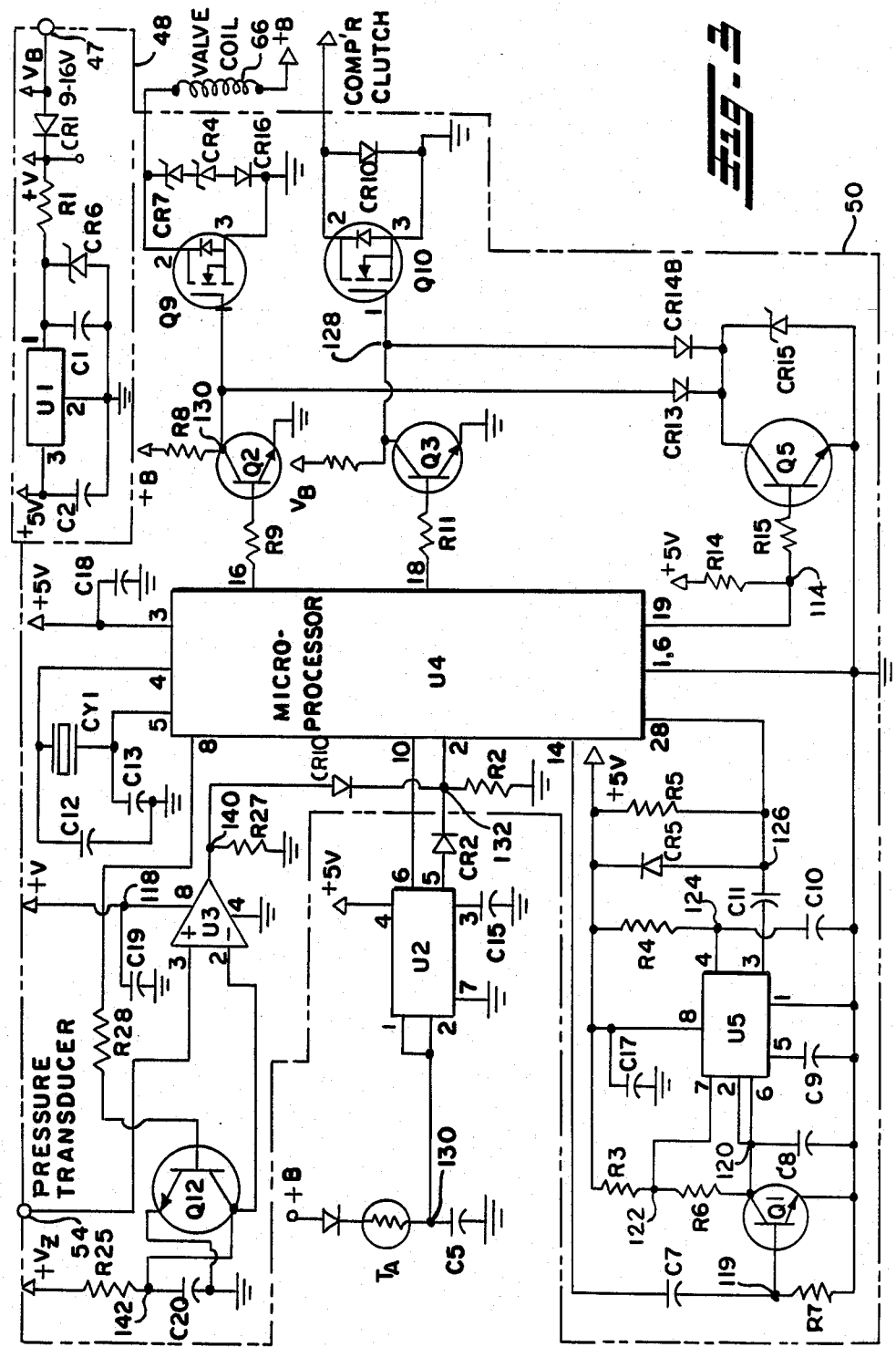
FIG. 3 is an electrical schematic for the microprocessor based controller of FIG. 1.

Referring to FIGS. 1 and 3, upon closure of the operator select switch 101, the microprocessor U4 which in the presently preferred practice comprises a solid state device bearing Motorola designation 68705P3, available from Motorola Semiconductor Products, 2060 Algonquin Road, Schaumburg, Ill. 60195, receives power at pin 3 thereof from the voltage regulator 48. The regulator Preferably comprises a solid state device U1 bearing Motorola designation MC7805 which receives at pin 1 thereof a voltage $V_B$ from the vehicle battery, typically 9 to 16 volts, through diode CR1 and resistor R1. The voltage regulator 48 provides through capacitor CZ a positive 5 volts at pin 3 of the processor U4.

Referring to FIG. 3, device CY1 is an oscillator in series to ground with capacitor C13 and in parallel with capacitor C12. CY1 is connected to pins 5 and 4 of microprocessor U4 for providing timing pulses preferably on the order of 4 mhz.

Controller 50 includes a "dead man" timer which monitors the microprocessor function. U4 provides an output on pin 14 thereof through capacitor C7 to junction 119 which is connected to the base of Q1 and to ground through resistor R7. Q1 has the emitter grounded and the collector junction connected to junction 120 which is connected to pin 6 of device U5 which comprises a LM555D timer available from National Semiconductor Corp. 2900 Semiconductor Dr., Santa Clara, Calif. 95051. U5 also has pin 6 connected to junction 120, pin 5 grounded through capacitor C9 and Pin 1 grounded Pin 7 of U5 is connected to junction 122 which is biased through resistor R3 with a positive voltage from the regulator 48. The voltage of junction 122 is also applied through resistor R6 to the collector junction of Q1. Pin 4 of U5 is connected to junction 124 which is grounded through capacitor C10 and junction 124 also is biased by a positive voltage through resistor R4. The output at pin 3 of U5 is connected through capacitor C11 to junction 126, which is biased through resistor R5 by a positive 5 volts from the regulator 48, and is protected by diode CR5 and is connected to input 28 of the microprocessor U4.

The device U5 is operative such that if a signal is not received from pin 14 to Q1, after 70 milliseconds, U5 is not reset by Q1 and provides a reset signal through pin 28 to the microprocessor U4.

When the microprocessor is operative to provide an output signal at pin 18, the signal is applied through resistor R11 to the base of Q3 which has its emitter grounded. The collector junction of Q3 is biased to a positive voltage from the battery through resistor R10 and is connected through junction 128 to the base or pin 1 of power FET device Q10. The output at pin 2 of Q10 is compressor clutch; and, the output at pin 3 of Q10 is grounded. When a signal is received from pin 18 of U4 to the base of Q3, Q3 conducts thereby dropping the voltage on junction 128 and turning power FET Q10 off thereby de-energizing the compressor clutch.

Similarly an output from pin 16 of U4 is applied through resistor R9 to the base of device Q2 which has its emitter grounded and its collector junction biased to a positive voltage from the battery through resistor R8 and connected to junction 130. Junction 130 is connected to input pin 1 or base of power FET Q9 which has its output pin 3 grounded and output pin 2 connected to the coil 66 of refrigerant valve 32. The outputs are protected by Zener diodes CR7, CR4 and diode CR16. When a signal is received from U4 pin 16 to the base of Q2, Q2 conducts, thereby dropping the voltage to junction 130 and turning Q9 OFF thereby disabling the valve coil for turning the valve off.

Thermistor $T_A$ receives a positive battery voltage through a diode with the remaining lead connected to a junction 130 which is connected through capacitor C5 to ground and also to input pin of device U2. In the presently preferred practice, U2 comprises a said National Semiconductor LM556 timer which receives a positive 5 volts from the regulator 48 at pin 4, with pin 7 grounded and pin 3 grounded through capacitor C15. A signal from the microprocessor pin 10 is applied to pin 6 of U2 and triggers U2 to discharge capacitor C5. When the voltage on pins 1 and 2 of U2 from junction 130 reaches two-thirds of the biased voltage, U2 applies a signal through its output pin 5 and diode CR12 to junction 132 which is connected to input pin 2 of U4 and also grounded through resistor R2.

The microprocessor U4 measures the time to receive the signal, the time measurement giving a digital representation of the voltage on $T_A$. The microprocessor can then look up the temperature of $T_A$ from a table of voltages and resistances provided by the manufacturer of the thermistor $T_A$. The table for values of temperature versus resistance for the thermistor $T_A$ is set forth below as Table I.

TABLE I

| °F. | °C. | R-T Curve | Alpha Temp. Coeff. | Resis. Dev. |
|---|---|---|---|---|
| −76 | −60 | 49.10 | 6.0 | 9.7 |
| −58 | −50 | 27.54 | 5.6 | 8.2 |
| −40 | −40 | 16.08 | 5.2 | 6.8 |
| −22 | −36 | 97.03 | 4.9 | 5.5 |
| −4 | −20 | 6.053 | 4.5 | 4.4 |
| 14 | −10 | 3.890 | 4.3 | 3.3 |
| 32 | 0 | 2.568 | 4.0 | 2.3 |
| 50 | 10 | 1.731 | 3.8 | 1.3 |
| 68 | 20 | 1.194 | 3.6 | 0.3 |
| 77 | 25 | 1.00 | 3.5 | 0.0 |
| 86 | 30 | .8413 | 3.4 | 0.6 |
| 104 | 40 | .8040 | 3.2 | 1.4 |
| 122 | 50 | .4412 | 3.1 | 2.4 |
| 140 | 60 | .3275 | 2.9 | 3.1 |
| 158 | 70 | .2468 | 2.8 | 3.7 |
| 176 | 80 | .1856 | 2.7 | 4.4 |
| 194 | 90 | .1460 | 2.6 | 5.1 |
| 212 | 100 | .1140 | 2.5 | 5.7 |

R-T: multiply resistance at 25° C. by listed valve to obtain resistance at temperature.
Alpha temperature coeff: denotes percent in resistance change per °C. at a specific temperature.
Resistance Deviation: add to resistance tolerance at reference temperature (25° C.) to give complete percentage of resistance deviation.

The pressure transducer signal is received along line 54 to the positive input at pin 3 of a comparator device U3 which in the presently preferred practice comprises a Motorola 2N2903D dvice. Comparator U3 receives a positive voltage at pin 8 thereof through junction 118 which is grounded throgh capacitor C19. The output of comparator 1 is applied to junction 140 which is grounded through resistor R27 and also applied through diode CR10 to input pin 2 of U4 through junction 132.

Pin 8 of the microprocessor is connected through resistor R28 to the base of Q12 which has its emitter grounded and its collector connected to the negative Input the end of U3. Pin 4 of U3 is grounded. The collector of Q12 is also applied to junction 142 which receives power from a positive voltage source from regulator 48 through resistor 25. Junction 142 is also grounded through capacitor C20. A signal is received from pin 8 of the microprocessor, Q12 conducts and discharges capacitor C20 to the negative pin of U3 thereby causing U3 to conduct a signal to pin 2 of the microprocessor U4. As explained above with respect to thermistor $T_A$, the microprocessor is operative to measure the time that the signal is received and to provide a pulse signal output proportional to the time.

The values of resistances, capacitances, diodes and other devices are listed in Table II as forth below.

TABLE II

| Resistance OHM | Capacitances Microfarads | Diodes and Other |
|---|---|---|
| R1-56 | C1 10, 35 V | CR1 GL41D |
| R2-10K | C2 .1, 50 V | CR2 MMBD914 |
| R3-100K |  | CR3 |
| R4-30K | CR-1 | CR4 IN5349 12 V, 5 W |
| R5-10K | C5-.1 | CR5 MMBD 914 |
| R6-1K |  | CR6 MLL 4145, 19 V, 1 W |
| R7-1K | C7-.01 | CR7 IN5349, 12 V, 5 W |
| R8-1K1 | C8-.1 | CR8 IN5352, 24 V, 5 W |
| R9-2.2K | C9-.01 |  |
| R10-1K | C10-2.2 | U1 MCT805 |
| R11-2.2K | C11-2.2 | U2 LM556D |
|  | C12-18 pico | U3 2N2903D |
|  | C13-18 pico | U4 M6805P2 |
| R14-10K |  | U5 LM555D |
| R15-2.2K | C15-.01 | Q1 2N3904 |
|  |  | Q2 2N3904 |
|  | C17-.01 | Q3 2N3904 |
|  | C18-.01 |  |
|  | C19-.01 | Q5 2H3304 |
| R21-7.3K | C20-.1 |  |
| R22-10K |  |  |
|  |  | Q9 BFS130 |
|  |  | Q10 BFS130 |
| R25-200K |  |  |
| R27-1K |  |  |
| R28-2.2K |  |  |
|  |  | CR13 MMBD914 |
|  |  | CR14 MMBD283B |
|  |  | CR15 MLL4346, 18V, 1W |
|  |  | CR16 GL41D |

Figure 5:
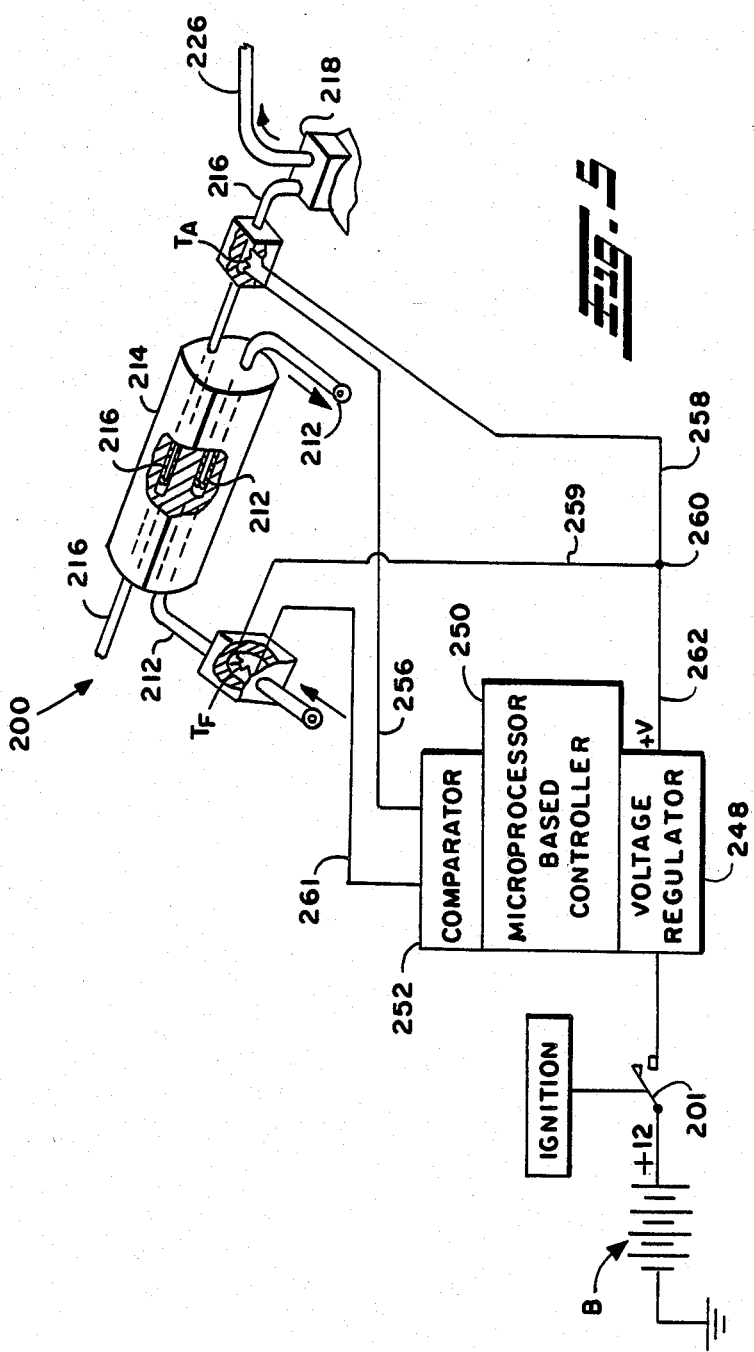
FIG. 5 is a portion of a schematic similar to FIG. 1, showing an alternate embodiment of the invention; and, FIG. 6 is a flow diagram of the embodiment of FIG. 5.

Referring to FIG. 5, an alternate embodiment of the invention is illustrated generally at 200 as having the fuel line heat exchanger 214 with refrigerant line 216 and fuel line 212 flowing therethrough with a thermistor $T_A'$ disposed in the discharge portion of the refrigerant line 216 as it returns to the compressor 218. The compressor discharge line 226 connects to the condenser which has been omitted for simplicity in FIG. 5. The inlet portion of refrigerant line 216 is connected to the block of the refrigerant expansion valve in a manner similar to that illustrated in FIG. 1, and which has been omitted in FIG. 5 for the sake of brevity.

A second thermistor $T_F$ is disposed in the inlet portion of fuel line 212 of the embodiment 200 for sensing the temperature of the fuel entering the heat exchanger 214.

In the presently preferred practice, the thermistor $T_A'$ is identical to that of the embodiment of FIG. 1; and, the thermistor $T_F$ comprises a 30K ohm NTC thermistor bearing Fenwall identification UUR43J24. The thermistor $T_F$ has one lead thereof connected to a comparator 252 which provides inputs to a microprocessor based controller 250 receiving a regulated voltage supply from regulator 248 which is connected via line switch 201 to a positive source of voltage, for example, the vehicle 12 volt battery indicated generally at B. Voltage regulator 248 provides a positive regulated voltage along line 262 to junction 260 which is connected via lead 259 to the remaining lead of fuel line thermistor $T_F$. Junction 260 also provides a positive voltage along line 258 to one lead of the thermistor $T_A'$ which has its remaining lead 256 also connected to comparator 252. It will be understood that the comparator 252, controller 250 and voltage regulator 248 are similar to the corresponding components employed for the embodiment of FIG. 1.

Referring now to FIG. 6, upon closure of the engine ignition switch and energization of the voltage regulator 248, an indicator set FLAG—$\Delta E=0$ is created at step 270 and a second indicator set FLAG—$T_F=0$ is created at step 272; and, a test is performed at 274 to determine whether the operator select control has been moved to a position to indicate a desire to operate the vehicle air conditioning system. If this is the case, a test is performed at 276 to determine whether the compressor clutch is already energized; and, if not, a Pressure reading is taken at step 278 from the pressure transducer 44. It will be understood transducer 44 is employed in the same manner in the embodiment 200 of FIG. 5 as is the case for the embodiment 10 of FIG. 1, the pressure transducer having been omitted in FIG. 6 for brevity.

If the pressure reading from step 278 is less than 18 psig, at step 280 the microprocessor returns to step 274. If the pressure read from step 278 is at least 18 Psig, at step 280, then the compressor clutch is energized at step 282; and, after a one-second time delay at step 284, an initial 40% duty cycle pulse-width signal is applied to the valve coil 66 at step 286. It will again be understood that the same valve 32 is employed in the embodiment 200 of FIG. 6 as is employed in the embodiment of FIG. 1. The valve having been omitted from FIG. 6 for simplicity.

After initial energization of the expansion valve 32, a second reading of the pressure transducer 44 is taken at step 288 and is tested at step 290 to determine whether the pressure is less than or at least 18 psig. If the pressure is less than 18 psig, the compressor clutch is disengaged as indicated at step 292. If the pressure reading from the transducer 44 is at least 18 psig at step 290, then the saturation temperature $T_S$ is obtained from a look-up table as indicated at step 294. The look-up table is obtained by tabulating the coordinates of plotted points on the graph of FIG. 4. Once the saturation temperature $T_S$ has been obtained, a signal input from thermistor $T_A'$ is obtained at step 296 and the value of temperature $T_A$ is determined from a look-up table at step 298 where the look-up table is taken from Table I hereinabove. The superheat $S_H$ is then obtained at step 300 by subtracting the temperature value $T_S$ from the temperature value $T_A$. The error term $\Delta E_{new}$ defined at step 302 and equated to $\Delta E_{old}$. $\Delta E_{new}$ is then equated to the value obtained by substracting 7° F. from the value of the superheat determined in step 300 as illustrated in step 304. The terms $\Delta\Delta E$ is defined in step 306 as the difference obtained by substracting $\Delta E_{old}$ from $\Delta E_{new}$, as determined in step 304 and as illustrated in step 306.

A test is performed at step 308 to determined whether the index FLAG—$\Delta E$ is equal to zero; and, if this is the case, the index FLAG—$\Delta E$ is set equal to one at step 310 and the microprocessor returns to step 288. If the index FLAG—$\Delta E$ is not equal to zero at step 308, then the pulse-width (PW) of the valve coil drive signal is determined at step 312 by the expression:

$$(PW) = \Delta E_{new}/4 + \Delta\Delta E/2 + (PW)$$

The pulse-width as determined in step 312 is then applied to the coil 66 of the value 32 and the microprocessor recycles to step 274.

Returning to step 276, if the compressor clutch is already energized, the microprocessor proceeds directly to step 288. Returning to step 274 if the Operator Select control is set for the air conditioning system to be OFF, then the microprocessor proceeds directly to step 314 where a test is performed to determine whether the output of thermistor $T_F$ indicates fuel line temperature greater than 150°. If this is the case, index FLAG—$T_F=1$ is set at step 316 and the logic proceeds to step 276.

If however, the fuel line temperature as measured at step 314 is not greater than 150° F., the test is Performed at step 318 to determine whether the index FLAG $T_F=1$ and if this is not the case, the logic proceeds directly to step 274. If however, the index FLAG—$T_F$ is equal to one at step 318, then a test is Performed at step 320 to determine if the fuel line temperature $T_F$ is less than 120° F. If the test at step 320 determines that the fuel line temperature $T_F$ is not less than 120°, the microprocessor proceeds directly to step 276. If however, the test at step 320 indicates that the fuel line temperature is less than 120°F., then the index FLAG —$T_F$ is set equal to zero and the compressor clutch is disengaged at step 292.

The present invention thus provides for cooling engine fuel in a Positively pressurized fuel line by providing a heat exchanger on the low pressure side of the fuel line returning to the tank for heat exchange with the air conditioning system refrigerant. The fuel line heat exchanger is disposed between the passenger compartment air conditioning evaporator and the compressor inlet; and, the system employs an electrically controlled expansion valve for controlling flow of refrigerant in a system.

In one embodiment of the invention, refrigerant is circulated through the fuel line heat exchanger only when the vehicle air conditioning system is operated, on the assumption that fuel cooling is needed only under high ambient temperatures. In another embodiment of the invention the system is operative to sense the temperature in the fuel line at all times and to engage the air conditioning compressor clutch when the fuel line temperature exceeds a desired value, irrespective of whether the vehicle air conditioning system has been energized by the vehicle operator. The present invention employs a unique and novel system for providing an electrical control signal for a microprocessor based controller to control the width of a pulse-width modulated signal to an electrically operated refrigerant flow control valve to provide adequate control of the flow of refrigerant through the air conditioning evaporator and the fuel line heat exchanger.

It will be understood that although the invention has been hereinabove been described with respect to the illustrated embodiments, modifications and variations may be made in the invention, which is limited only by the following claims.

We claim:

1. A system for controlling vapor lock in an engine fuel line comprising:
   (a) a first and a second endothermic heat exchanger serially connected, said first exchanger disposed for cooling a compartment and said second exchanger in heat exchange relationship with said fuel line;
   (b) an exothermic heat exchanger;
   (c) electrically operated expansion valve means;
   (d) refrigerant conduit means connecting said expansion valve means intermediate said exothermic heat exchanger and first endothermic heat exchanger:
   (e) compressor means operative upon energization to circulate refrigerant through said exothermic heat exchanger through said expansion valve means and through said first and second endothermic heat exchangers;
   (f) pressure sensing means disposed to sense the pressure of refrigerant flow between said first and second endothermic heat exchangers and provide an electrical signal indicative of said pressure;
   (g) temperature sensing means disposed in a conduit means between said second endothermic heat exchanger and said compressor means and operative to provide an electrical signal $T_A$ indicative of the temperature of refrigerant flow in said conduit means;
   (h) means to convert said sensed pressure to saturation temperature, $T_S$, for the refrigerant being circulated; and
   (i) comparator means operable to compare $T_A$ and $T_S$ and generate a control signal indicative of said comparison and means for operating said expansion valve means responsive to said control signal; and;
   (j) means operative to circulate engine fuel through said second endothermic heat exchanger for heat exchange with said refrigerant.

2. The system defined in claim 1, wherein said control signal comprises a width modulated pulse for opening said expansion valve means at varying fractions of the period of said pulse.

3. The system defined in claim 1, wherein said control signal comprises a width modulated pulse having initially a width comprising 40% of the period of said pulse.

4. The control system defined in claim 1, further comprising:
   (a) a fuel temperature sensor disposed in said fuel line and operative to emit an electrical signal indicative of said fuel line temperature; and
   (b) means receiving said fuel temperature signal and operative to energize said compressor means when said fuel line temperature rises to a predetermined level.

5. The control system defined in claim 1, further comprising a thermistor disposed in said fuel line and means operative to sense the change in resistance of said thermistor in response to changes in fuel line temperature; and, means responsive to sensing a predetermined level of said thermistor resistance operative to energize said compressor means.

* * * * *